(12) United States Patent
Mittelstaedt (10) Patent No.: US 7,556,274 B2
(45) Date of Patent: Jul. 7, 2009

(54) MANUAL WHEELCHAIR DRIVE SYSTEM

(76) Inventor: Mark Mittelstaedt, 5941 E. Fort Crittendon, Tucson, AZ (US) 85750

( * ) Notice: Subject to any disclaimer, the term of this patent is extended or adjusted under 35 U.S.C. 154(b) by 481 days.

(21) Appl. No.: 11/433,886

(22) Filed: May 15, 2006

(65) Prior Publication Data

US 2006/0208452 A1   Sep. 21, 2006

Related U.S. Application Data

(63) Continuation-in-part of application No. 11/049,312, filed on Feb. 1, 2005, now abandoned.

(51) Int. Cl.
*B62M 1/14* (2006.01)
(52) U.S. Cl. .................. 280/246; 280/250.1
(58) Field of Classification Search .......... 280/244, 280/246, 253, 256, 250.1, 304.1
See application file for complete search history.

(56) References Cited

U.S. PATENT DOCUMENTS

| | | | | | |
|---|---|---|---|---|---|
| 3,994,509 | A | * | 11/1976 | Schaeffer | 280/250.1 |
| 4,506,900 | A | * | 3/1985 | Korosue | 280/250.1 |
| 5,020,818 | A | * | 6/1991 | Oxford | 280/250.1 |
| 5,303,945 | A | * | 4/1994 | Oxford | 280/304.1 |
| 5,577,748 | A | * | 11/1996 | Dombrowski et al. | 280/244 |
| 5,657,836 | A | * | 8/1997 | BeVier | 188/2 F |
| 5,746,437 | A | * | 5/1998 | Faber | 280/304.1 |
| 6,017,046 | A | * | 1/2000 | Markovic | 280/250.1 |
| 6,428,028 | B1 | * | 8/2002 | Folino et al. | 280/249 |
| 6,715,780 | B2 | * | 4/2004 | Schaeffer et al. | 280/248 |

FOREIGN PATENT DOCUMENTS

| EP | 352350 A1 * | 1/1990 |
|---|---|---|
| JP | 2005110894 A * | 4/2005 |

* cited by examiner

*Primary Examiner*—Kevin Hurley (57) ABSTRACT

A system for providing a wheelchair user access to forward, neutral and reverse movement while maintaining a continuous grip, silent operation, and allowing for small rotational movements of the wheelchair wheel to be easily made. The system includes a one-way bearing which is attached to a wheelchair wheel such that the center of the one-way bearing is coaxial with the wheelchair wheel axle, a drive axle mounted through the center of said one-way bearing, and a drive rod.

1 Claim, 9 Drawing Sheets

MANUAL WHEELCHAIR DRIVE SYSTEM

CROSS REFERENCE TO RELATED APPLICATIONS

This application is a continuation in part of U.S. patent application Ser. No. 11/049,312, which was filed on Feb. 1, 2005 now abandoned, which is hereby incorporated by reference.

BACKGROUND OF THE INVENTION

The present invention relates to a manually operated lever drive system for wheelchairs that attaches as an after-market application to the primary drive wheels. Manually powered wheelchairs are often used by people who have physical impairments that diminish the strength available for propelling the wheelchair. The fundamental physical requirements of an individual utilizing a manual wheelchair are inherently contrary to abilities and limitations of the impaired because in general, and by design, manually powered wheelchairs require the user to grasp a circular hand-ring that is attached to the wheelchair drive wheel. To move the chair, the user is required to grip this ring and apply manual pressure to rotate the hand-ring and corresponding wheel in the desired direction of travel. Since the grip is concentric with the wheel, and rotates as the wheel rotates, the user can apply maximum force to the rotating grip for only a portion of the rotation of the wheel. The ring then rotates out of the reach of the user, and the user needs to release the circular ring and grab it again at another point on the circumference of the ring, and reapply muscular pressure to keep moving. In addition to the circular hand-ring, there are a number of existing variations of the circular hand-ring, i.e., a hand-ring with protruding knobs located along the circumference of the hand-ring for those individuals not possessing an ability to grip a standard hand-ring.

There are many systems for driving wheelchairs, which include various mechanisms with gears and sprockets, a plurality of wheels, drive linkages and cables, motors, and other methods. In U.S. Pat. No. 4,523,769, Glaser uses a lever/ratchet mechanism to drive gears for propulsion. Taylor (U.S. Pat. No. 6,234,504) uses levers to drive sprockets, connected to the drive wheel via chains, similar to Banzi (U.S. Pat. No. 6,325,398). In U.S. Pat. No. 6,634,663, Mitchell uses a lever to operate a crank handle that presses on circular handrails when pressure is applied. In U.S. Pat. No. 6,325,398, Banzi discloses a chain transmission. Drake (U.S. Pat. No. 5,941,547) uses one-way bearing clutches, but attaches the bearings and drive levers to a pivot point on the wheelchair frame, moving the lever attachment point away from the center of gravity of the chair, requiring a drive cable to convert lever motion to rotational motion. Sheaffer, in U.S. Pat. No. 3,994,509, cites the use of overrunning clutches, but connects them to a chain to drive the wheel(s).

Oxford (U.S. Pat. No. 5,303,945) discloses a ratchet wrench to apply motive power. Oxford's use of a ratchet wrench allows the user to maintain a grip on the drive handle. However, it requires the user to release the drive handle to operate a lever to control a shifting mechanism. Since the shifting lever rotates with the wrench, it changes rotational location with every stroke. Thus, the user has no knowledge of the rotational position of said shifting lever at any given moment, and will need to either look at the wheel or search manually to locate said shift lever. Additionally, a ratchet wrench comprises a plurality of gear teeth which click past a spring-loaded pawl when the handle is returned to the starting position to reapply motive power, such that the user is accompanied by a clicking noise during each rewinding stroke, or while in neutral and the chair is in motion, such as while coasting or rolling downhill. The prior art lacks the ability to provide a silent means of propulsion, so the user of a lever-driven wheelchair is not accompanied by noise whenever the user moves the chair.

Furthermore, when a ratchet wrench is used, there is some distance of travel through which the mechanism must be moved before the ratchet engages and forward travel is again possible after the rewind stroke. This distance, sometimes characterized as "play", is due to the inherent design of a ratchet wrench. Therefore, traveling short distances require the handle to travel distances out of proportion to the desired distance of travel, making small position adjustments difficult when using a drive system comprising a ratchet wrench. There is a need to provide a lever driven mechanism with no play, so precise chair positioning is easy.

Another problem with Oxford's approach is the difficulty in using the levers on either side of the chair independently. If the mechanism remains "tight", the various elements comprising the "inverted U-shaped member" will not easily slide relative to each other, which is required for operation. If they are loose enough so they can easily slide past each other and allow independent use of the levers, there will be more play in the mechanism, which will make the chair noisy, and less efficient to operate. There is no provision to flex individual, dedicated handles towards the user, against the surface of the wheel hand-ring, for frictional braking and/or steering. Another, more glaring problem with Oxford's approach is that the U-shaped member has to be removed each time a user needs to enter or exit the chair, then re-assembled when the user needs to re-enter the chair. The prior art fails to provide a system that is easy to use and easy to access, so a user can sit down in the chair and immediately start moving the chair by pressing on the lever handles, with no adjustments required, no mechanisms to move out of the way, no switches to locate to place the drive system in neutral, and no gears, cables, sprockets, or any other exposed hardware to present a physical hazard to the impaired.

SUMMARY OF THE INVENTION

The invention relates to attaching a wheelchair drive system to the spokes of a wheelchair as a lever-drive mechanism that does not use gears, cables, sprockets or transmissions to apply power to the wheelchair wheels. A drive lever, or handle, comprised of metal tubing, is attached to the proximal end of a mounting pin by an attachment means. The tubing that comprises the drive lever has a drive rod locator at its proximal tip. The drive rod passes through an aperture in the drive locator. The diameter of this aperture closely approximates the aperture in the drive rod locator. In various embodiments, various drive handles can be attached to the proximal tip of the drive rod, above the drive rod locator, by an attachment means, to accommodate the grips of various users.

When the drive rod is passed through the extent of the drive lever handle and thence through an aperture on the drive lever mounting pin, and the axle has rotated such that an aperture in the axle, perpendicular to its axis of rotation, is now beneath the aperture in the drive lever mounting pin, the drive rod slides into the aperture in the drive axle for drive engagement. Once the drive rod has been engaged, forward pressure on the drive handle(s) provides silent rotational motion of the axle, thereby propelling the chair as a result of the pressure applied by the drive lugs against the spokes of the wheel. The distal tip of the drive rod is rounded to facilitate its' passage into the aperture in the drive axle. In other embodiments, several holes are drilled through the axle perpendicular to its axis of rotation, to minimize the amount of rotation of the axle required for drive engagement.

There are two apertures in the mounting pin; the primary aperture centered on the pin diameter, extending through the entire length of the pin, and a secondary aperture located at the distal end of the mounting pin, perpendicular to the primary aperture. The axle passes through the secondary aperture of the mounting pin and proceeds through the center of a one-way bearing, which is firmly mounted in a bearing housing by an attachment means. In another embodiment, the bearing housing of the drive system attaches to a wheelchair wheel by an attachment that clamps the wheelchair wheel spokes between drive lugs. Various embodiments require various drive lug and housing shapes to clamp various spoke designs. In another embodiment, the one-way bearing is oriented and installed in a dedicated unidirectional manner, such that the installed direction of rotation results in forward travel of the wheelchair wheel onto which the drive system is mounted.

A drive axle extends through the drive lever mounting pin, and then through a one-way bearing mounted in a bearing housing. The axle is coupled to the bearing by an attachment means. The bearing housing and lever mounting pin are retained on the axle by retaining rings. The housing is attached to the spokes of the existing wheelchair wheel by an attachment means, such that the drive axle's axis of rotation is coaxial with the wheelchair drive wheel's axis of rotation. The outer diameter of the drive axle is firmly coupled to the inner diameter of the one-way bearing by an integrated coupling means. The one-way bearing provides no resistance when the said drive axle is rotated in the reverse direction. Therefore, the lever can be easily returned to the point at which forward pressure can then be resumed to drive the chair forward. In the preferred embodiment, one of these mechanisms is mounted on each drive wheel of a wheelchair.

An internal rod, housed within the drive lever tube, is attached to a handle located above the proximal end of the drive lever tube, and passes retractably through an aperture in a rod locator pin at the proximal end of the drive lever tube. This rod proceeds through the length of the drive lever tube, and then proceeds through the primary aperture in the axle mounting pin, engaging the drive axle by sliding into an aperture in the drive axle. The aperture in the drive axle is perpendicular to the axle's axis of rotation, and closely approximates the diameter of the internal rod. Associated retaining rings keep the axle located such that the primary aperture of the mounting pin remains in place, along the axle where the aperture in the drive axle is located.

The wheelchair drive system is engaged when the axle has been rotated such that the rod can pass through the aperture in the axle, and thereby traverse through the axle perpendicularly to the axle's axis of rotation. Pushing the lever forward then results in rotation of the axle, providing drive power to the wheelchair. When the drive rod is retracted upwards, such that the rod no longer traverses the drive axle, the drive axle is disengaged. The wheelchair can now be freely rolled forwards and backwards, consistent with original equipment usage and limitations.

As an associated, dedicated, safety factor, brake shoes are mounted to each drive lever such that, depending on the embodiment, they contact either the outer surface of the wheelchair rim, or the hand-ring, when the user flexes the drive handle towards the user, thereby applying frictional contact between the brake shoe and one of the above surfaces. Flexing one lever towards the user, thereby applying frictional braking to one of the surfaces, provides an element of steering control to the wheelchair. The chair can be easily turned, either at rest or while in motion, by braking with one lever and applying forward power with the other. When one drive lever is disengaged by retraction of the axle rod, and the lever handle is flexed so as to provide friction between the brake shoe and the wheel or hand-ring, and then rotated to provide reverse travel, and the opposite lever is used to provide forward motion, the chair can be pivoted in place, so the user can turn around in a very small space, like an elevator. If both drive rods are disengaged, frictional contact and rearward rotation of both handles can then be utilized as a means of driving the chair reverse.

In one embodiment, different attachments may be used to attach the drive system to various spoke designs, or directly or indirectly to the hub of the drive wheel. In the preferred embodiment of this invention, one of these drive systems is mounted to each side of the wheelchair, such that there is a drive lever on each wheelchair drive wheel. The drive lugs are shaped such that they engage the spokes of the wheelchair wheel, and locate the axis of rotation of the bearing coaxially with the free-rotating axle of the wheel. In other embodiments, the bearing housing may be mounted directly to the hub of the wheel, eliminating the need for separate drive lugs. The option of utilizing the lugs provides for an after the fact installation on an existing wheelchair wheel. The outside surface of the drive lever, located approximate to the hand-ring of the wheelchair, has a frictional braking surface attached such that when the drive handle is flexed towards the wheelchair drive wheel, the braking surface contacts the hand-ring, in the preferred embodiment, providing frictional contact for braking or steering. In other embodiments, the wheelchair wheel rim is engaged by the frictional braking surface.

The mechanical advantage provided by the drive system lever, coupled with the power transmission resulting from mounting a drive axle coaxial within the hub of an existing wheel, utilizing a one way bearing clutch to provide a simple—and silent—mechanism for returning the lever to its drive position, allows wheelchair users to propel a wheelchair using the large muscles in their upper bodies, in a relaxed and upright position, while maintaining a continuous grip on the handle for control and braking. Thus, it will be appreciated that the invention provides a new and improved manual wheelchair driving system.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DETAILED DESCRIPTION OF THE PREFERRED EMBODIMENTS

Figure 1:
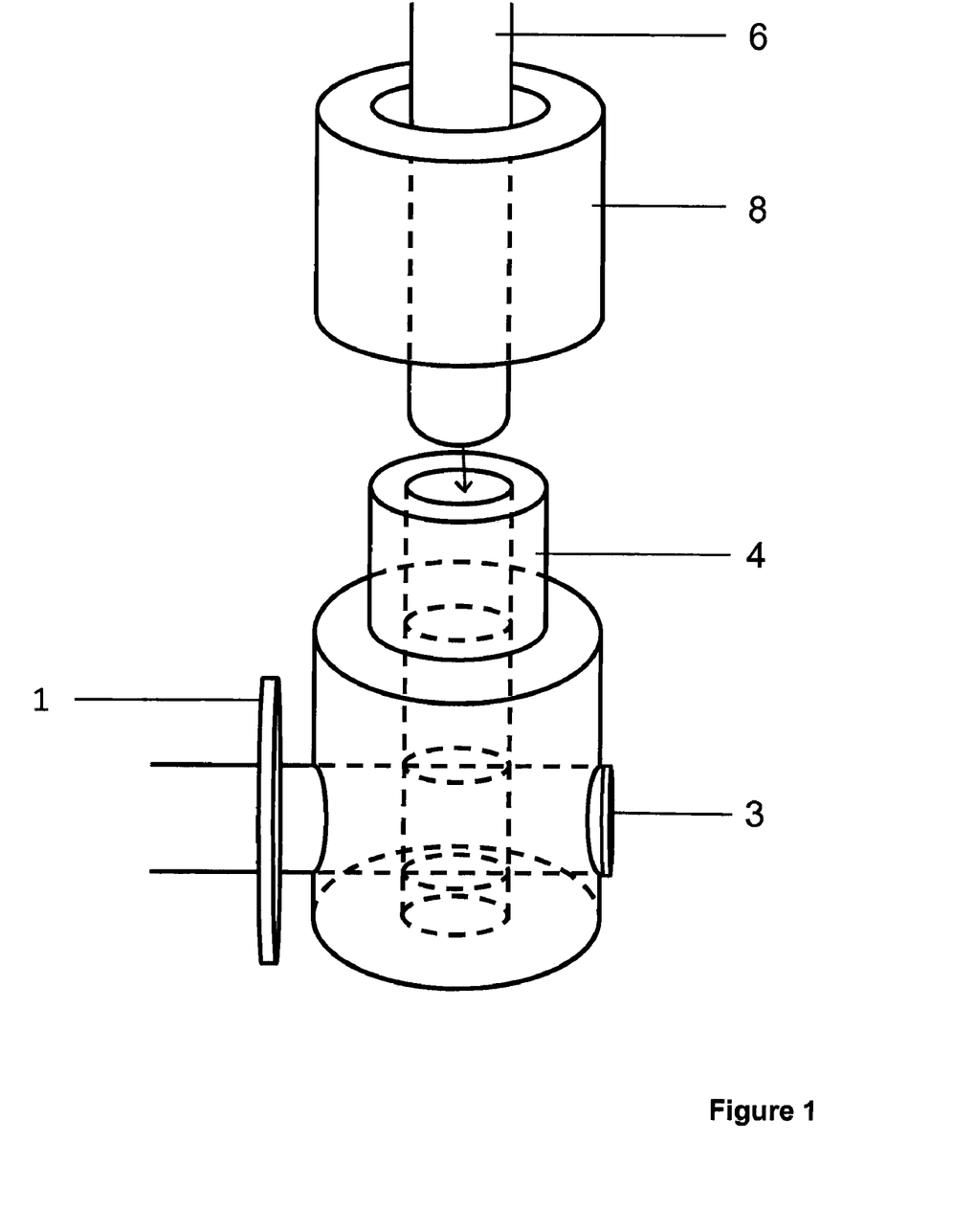
FIG. 1 is a cross-sectional view illustrating a drive axle extending through a drive lever mounting pin through the center of a one-way bearing.

FIG. 1 shows a perspective cross section of a drive axle 3 extending through an aperture of drive lever mounting pin 4, and then through the center of one-way bearing 1. Apertures for drive rod 6 in drive lever mounting pin 4 and axle 3 can be seen; dotted lines describe both apertures. The distal tips of drive rod 6 and drive lever 8 can be seen above drive lever mounting pin 4. The distal tip of the tubing comprising drive lever 8 is pressed down to the shoulder of drive lever mounting pin 4, and then permanently attached via an attachment means upon assembly. The driver lever 8, or handle, is in one embodiment as a metal tubing.

Figure 2:
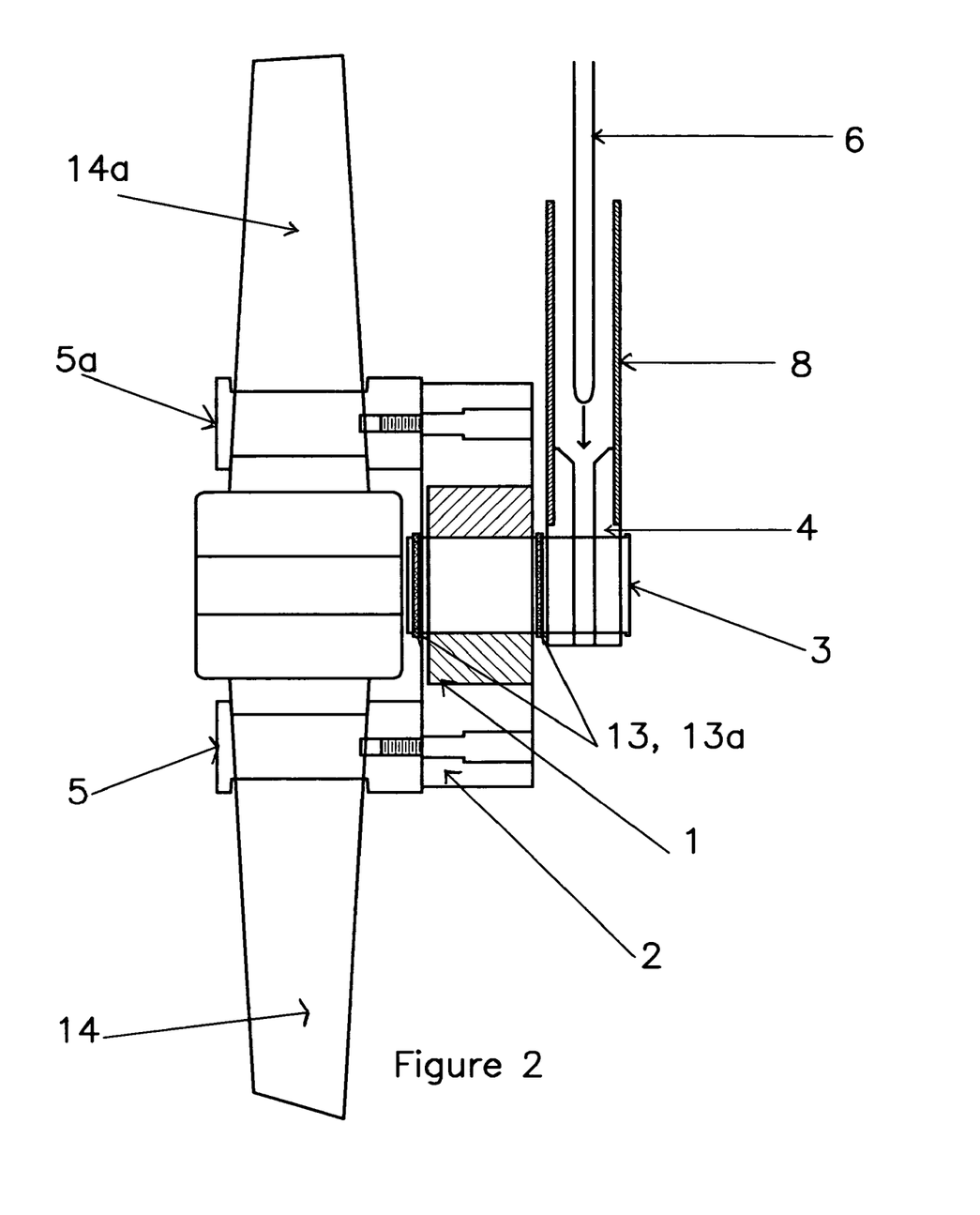
FIG. 2 is a schematic side view of the invention attached to a wheelchair drive wheel.

FIG. 2 shows a cross section of one-way bearing 1 in housing 2 attached to the wheelchair drive wheel spokes 14/14a by means of drive lugs 5/5a. Said drive lugs, which can be rigidly attached to housing—in this embodiment by threaded fasteners—clamp said spokes. Various embodiments will have a varying numbers of lugs, and various lug cross-sections, to accommodate, and clamp, various wheel/spoke designs. Axle 3, mounting pin 4, drive rod 6, drive lever 8, and retaining rings 13/13a can also be seen in cross section.

Figure 3:
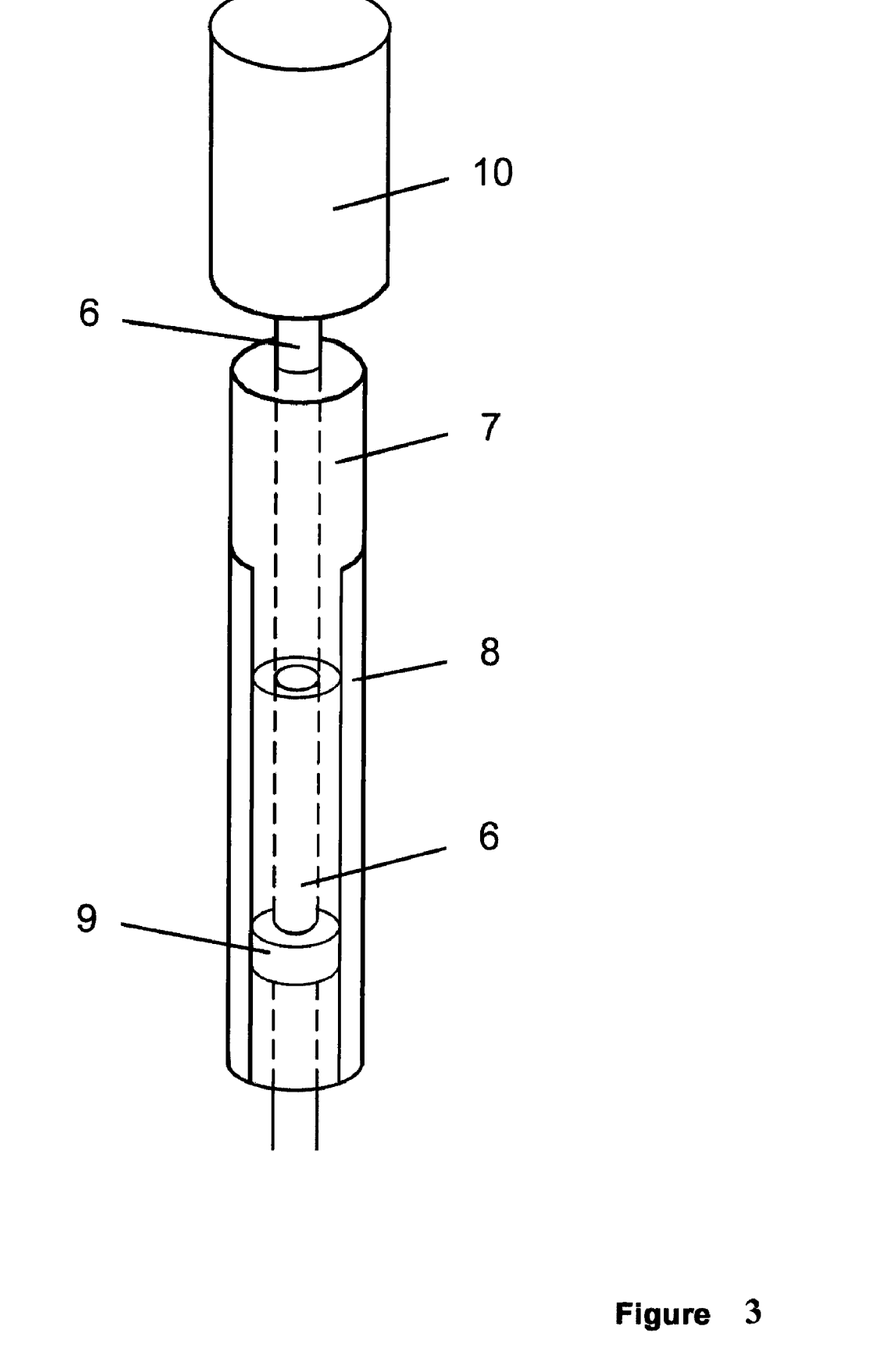
FIG. 3 is a cross-sectional view of a drive rod locator pressed into the drive lever.

FIG. 3 shows a perspective cross section of drive rod locator 7 pressed in to the proximal tip of drive lever 8, where it is permanently mounted with an attachment means at assembly. A handle, 10, is attached to the proximal tip of drive rod 6 above the drive rod aperture in drive rod locator 7. Drive rod 6 extends through the length of drive lever 8; only a section of drive lever 8 is shown. Shaft collar 9 is attached to drive rod 6 below rod locator 7, to limit the upward travel of drive rod 6 when it is adjusted upwards to disengage the drive axle, so the distal tip of said rod stays within the proximal tip of the drive lever mounting pin, but completely exits the aperture in the drive axle.

Figure 4:
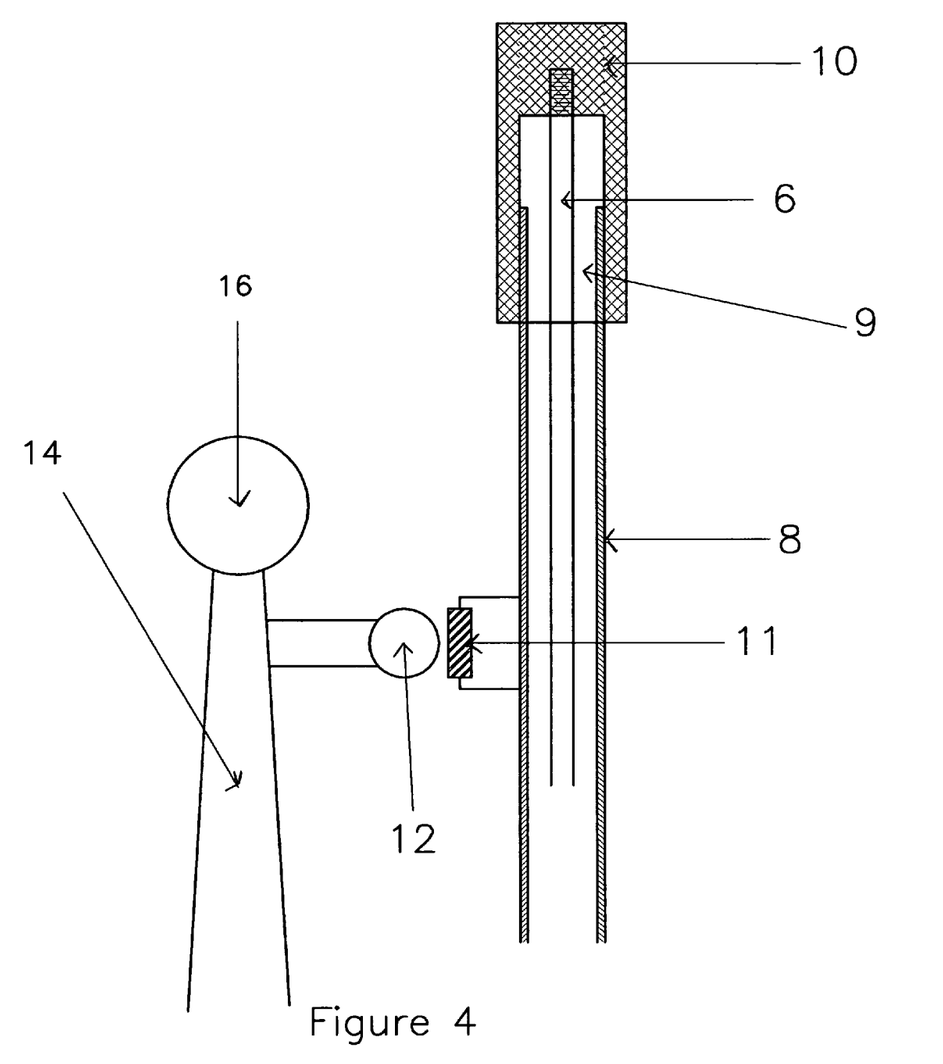
FIG. 4 is a schematic side view illustrating a frictional brake assembly.

FIG. 4 shows a cross section of a frictional brake assembly 11, attached along the length of drive handle 8 such that it is pressed against the outer surface of the manual wheelchair wheel hand-ring 12, attached to the wheelchair spokes 14, both seen in cross-section, when drive lever 8 is flexed towards said wheelchair wheel, providing braking, steering, and a frictionally-operated reverse.

Figure 5:
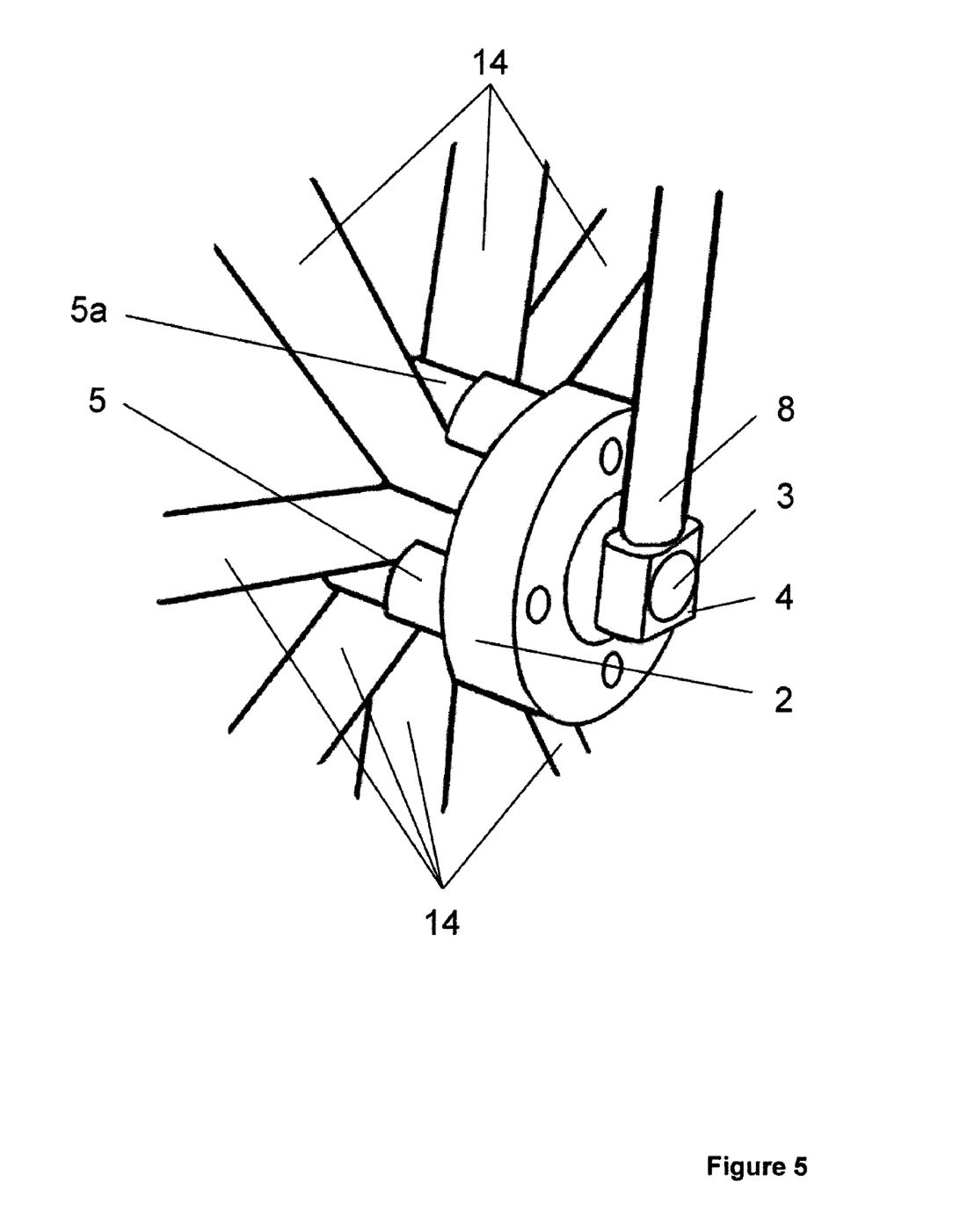
FIG. 5 schematically illustrates a first embodiment of the invention.

FIG. 5 shows a perspective view of a section of drive handle 8, drive lever mounting pin 4, axle 3, one-way bearing 1, housing 2, drive lugs 5/5a, and sections of a plurality of spokes (14).

Figure 6:
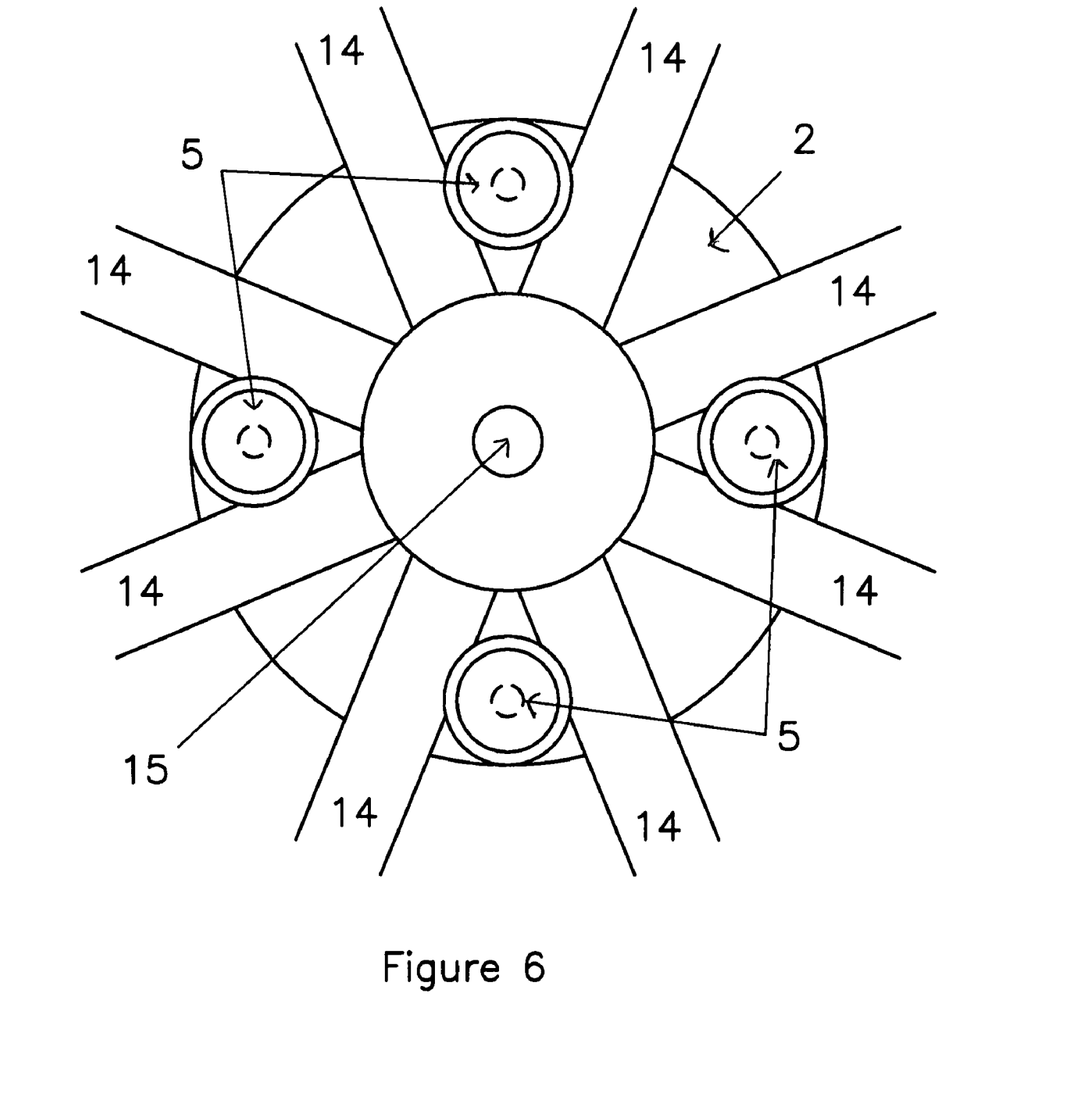
FIG. 6 is a schematic, cross sectional view of a housing assembly from the inside of the wheel.

FIG. 6 shows a view of the housing assembly from the inside of the wheel. A plurality of spokes (14) and drive lugs 5 can be seen, as well as the outline of housing 2, and the wheelchair axle 15.

Figure 7:
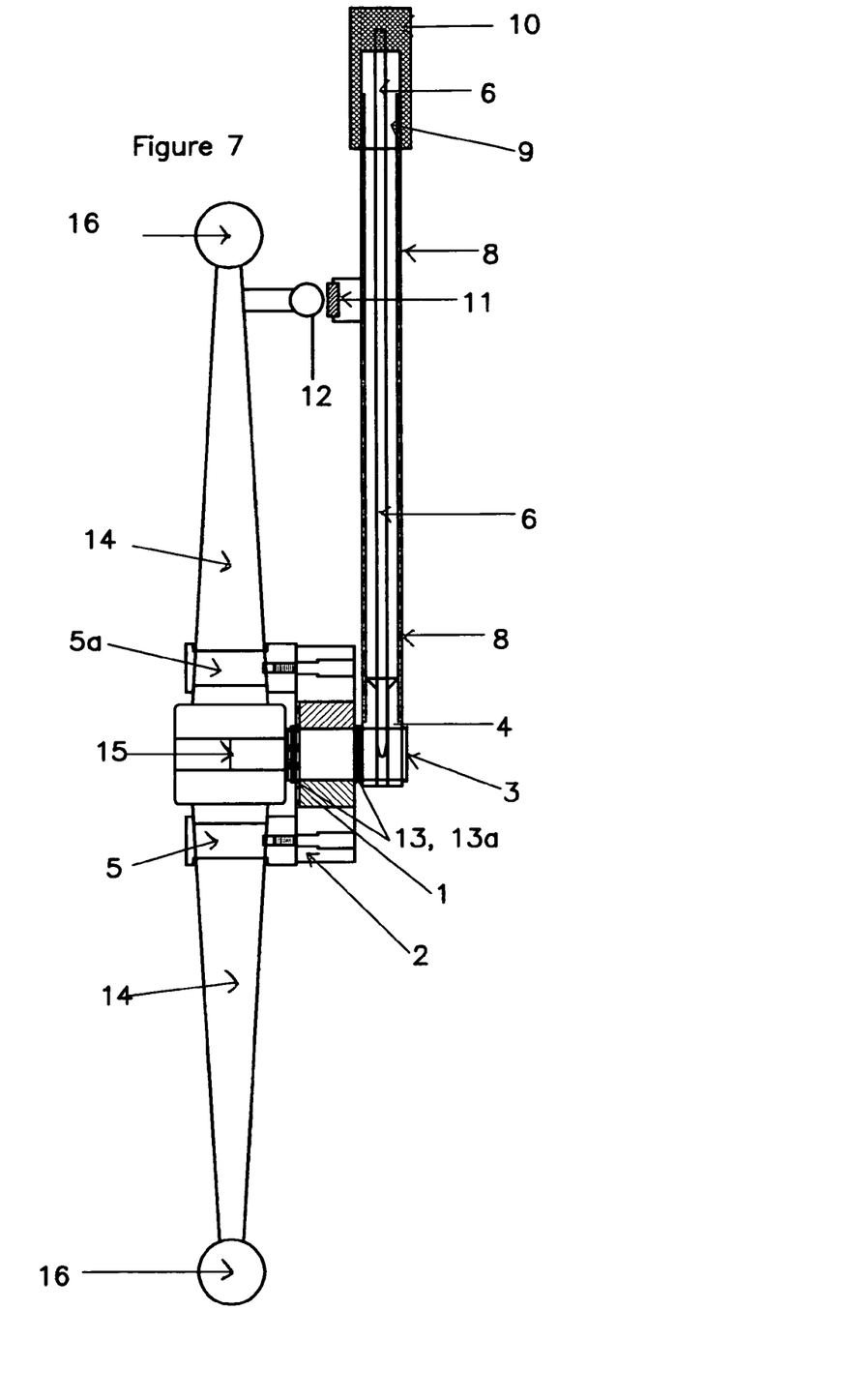
FIG. 7 schematically illustrates the entire assembly of the invention.

FIG. 7 shows a cross section of the entire assembly.

Figure 8:
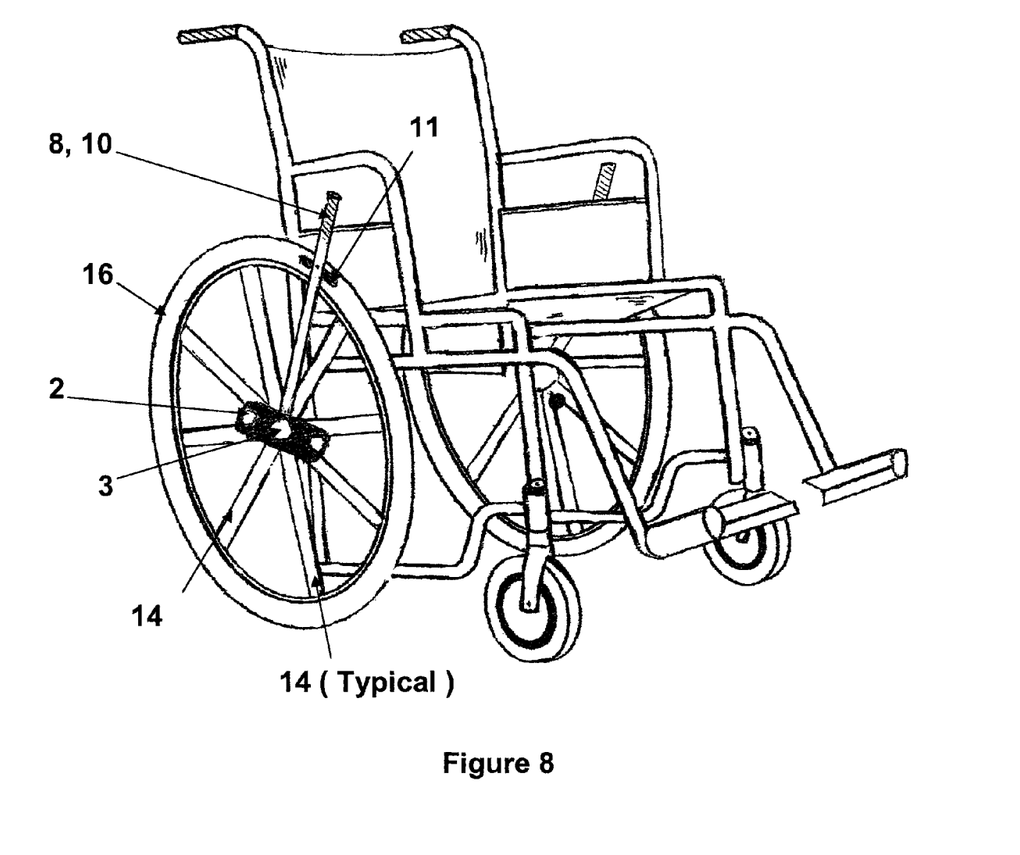
FIG. 8 schematically illustrates the entire assembly mounted to a wheelchair.

FIG. 8 shows the entire assembly mounted to a wheelchair. In FIG. 8, the housing design is a rectangular embodiment, and the brake shoe is shown contacting wheel rim/tire assembly 16. In another embodiment, the assembly 16 is permanently mounted to the primary drive wheels of a wheelchair.

Figure 9:
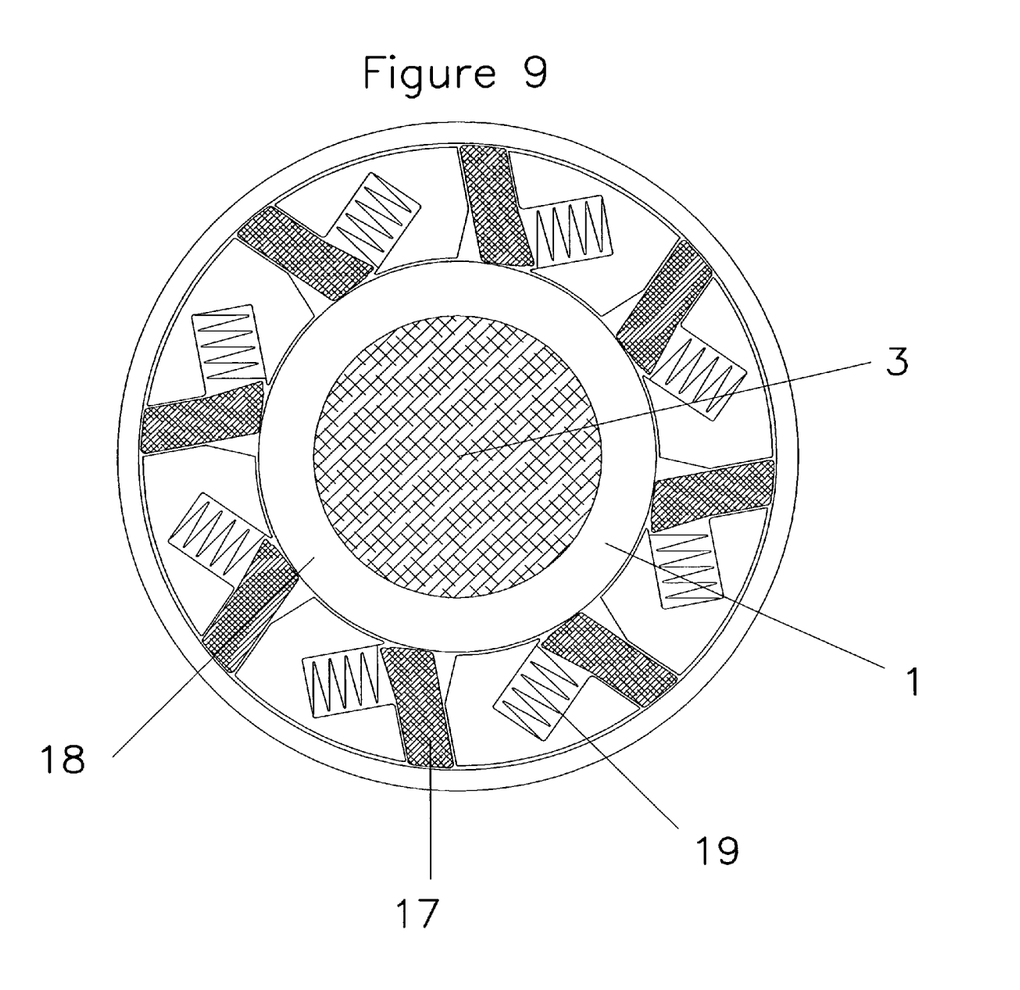
FIG. 9 is a cross-sectional view of a one-way bearing.

FIG. 9 shows a cross-section of one-way bearing 1. The cams, 17, allow free clockwise rotation of inner race 18, but lock instantly when the axle 3 is turned counterclockwise and the springs, 19, push the bottom of said cams against the adjacent surface of said inner race.

What is claimed is:

1. A manual wheelchair drive attachment, comprising:
   a one-way bearing which is attached to a wheelchair wheel such that the center of said one-way bearing is coaxial with the wheelchair wheel axle,
   a drive axle mounted through the center of said one-way bearing, and
   a drive rod attached to a handle which is also attached to said drive axle, said rod retractably extending through an aperture in said drive axle such that when said drive rod is passed through said aperture to engage said axle, said drive axle can be rotated forwardly by applying forward pressure to said handle, thereby propelling the chair forward, and said axle can be disengaged by applying upward pressure on said handle to retract said drive rod from said axle, so a user does not have to move his hand from the handle to disengage said drive axle and access neutral, so said chair can be freely rolled.

* * * * *